United States Patent [19]

Fujita

[11] Patent Number: 5,481,360
[45] Date of Patent: Jan. 2, 1996

[54] OPTICAL DEVICE FOR MEASURING SURFACE SHAPE

[75] Inventor: Hiroo Fujita, Sayama, Japan

[73] Assignee: Citizen Watch Co., Ltd., Tokyo, Japan

[21] Appl. No.: 77,738

[22] Filed: Jun. 18, 1993

[30] Foreign Application Priority Data

Jun. 19, 1992 [JP] Japan .................................. 4-184777
Jul. 28, 1992 [JP] Japan .................................. 4-219641

[51] Int. Cl.$^6$ ............................ G01B 11/00; G01B 9/02
[52] U.S. Cl. ........................................... 356/360; 356/349
[58] Field of Search ...................................... 356/349, 360

[56] References Cited

U.S. PATENT DOCUMENTS

| | | | |
|---|---|---|---|
| 4,145,758 | 3/1979 | Drexler et al. | 365/200 |
| 4,577,967 | 3/1986 | Fujita | 356/349 |
| 4,650,330 | 3/1987 | Fujita | 356/349 |
| 4,660,983 | 4/1987 | Yamamoto et al. | 356/124 |
| 4,994,990 | 2/1991 | Fujita et al. | 356/394 |

OTHER PUBLICATIONS

"Precise Gap Figure Measurement Method Using Laser Heterodyne Interferometry with Two–Beam Scanning", Hiroo Fujita, Kogaku, vol. 22, No. 2, Nov. 1992, pp. 105–111.

*Primary Examiner*—Robert P. Limanek
*Assistant Examiner*—Alexander Oscar Williams
*Attorney, Agent, or Firm*—Finnegan, Henderson, Farabow, Garrett and Dunner

[57] ABSTRACT

A device capable of simultaneously measuring vertical hight of shapes and surface shape characteristics of an object, maintaining high precision. An acousto-optical element generates two beams of different frequencies of which the intensity distribution can be freely controlled. The optical device is provided with an optical heterodyne interference function and a cofocal scanning microscope function, and the extrasurface shape is measured by detecting the phase of a reflected light signal and the intrasurface shape is measured by detecting the cofocal point of a reflected light intensity signal. The extrasurface and intrasurface shapes can be simultaneously measured maintaining high precision in real time. The two beams used as probe light are little affected by vibration, etc., and make it possible to obtain stable measurement. The reflected light signal needs be simply processed using a small and cheaply constructed device which lends itself well to in-line measurement in production lines.

4 Claims, 11 Drawing Sheets

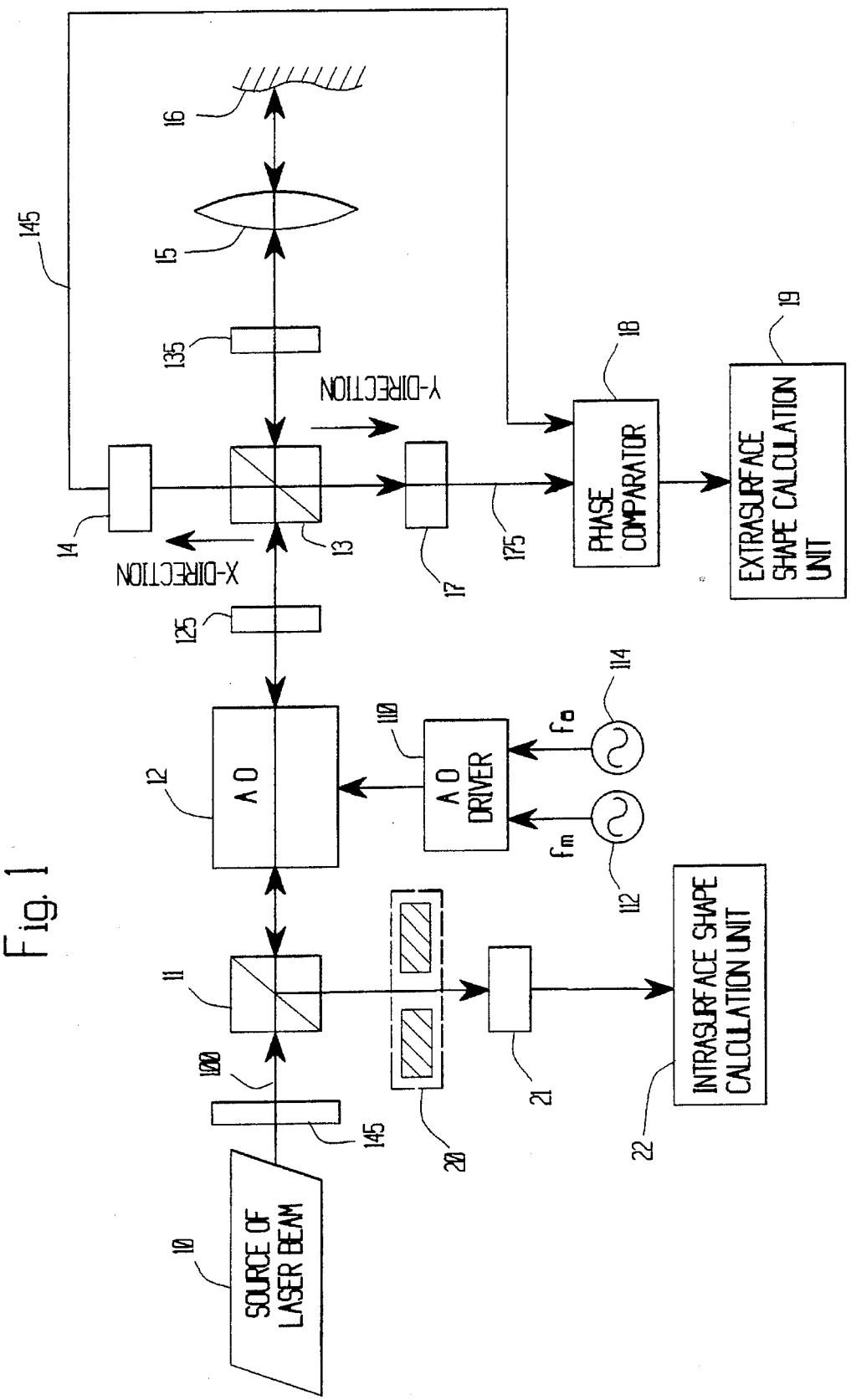

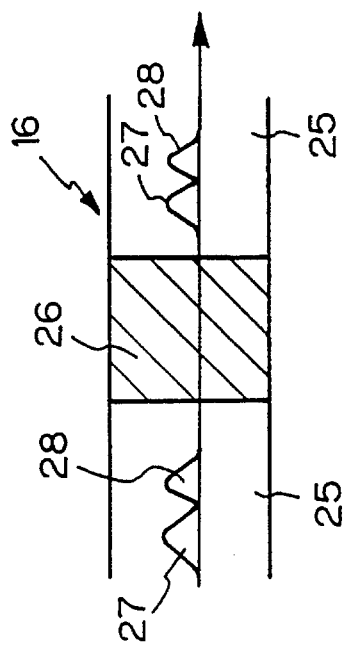
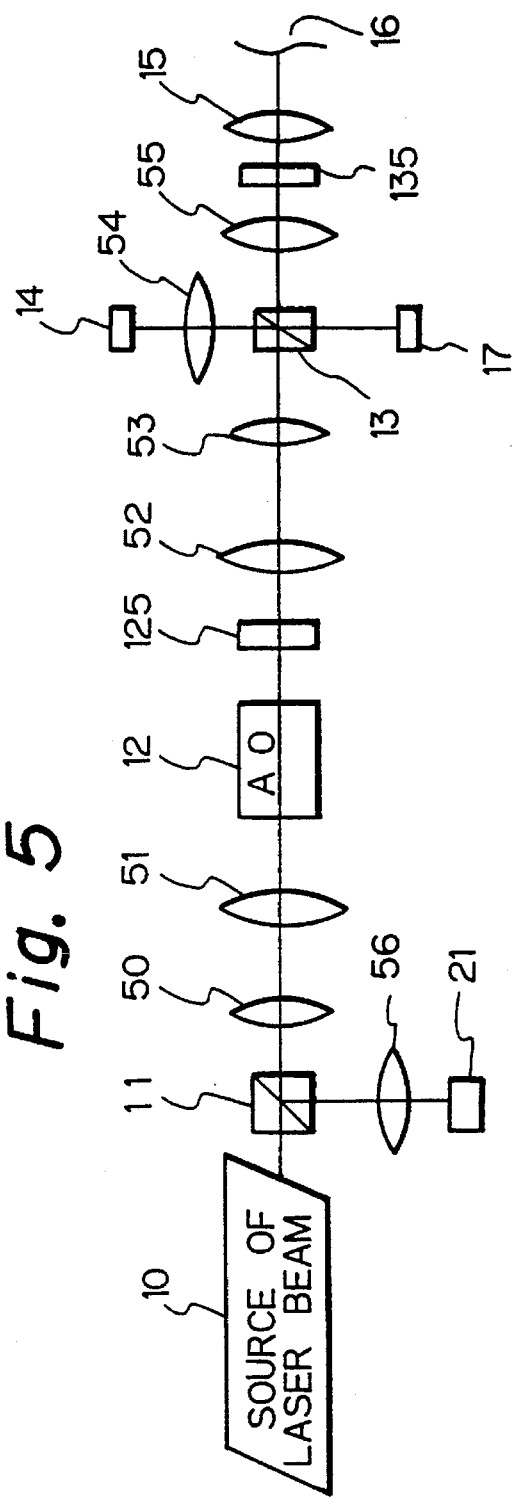

OPTICAL DEVICE FOR MEASURING SURFACE SHAPE

BACKGROUND OF THE INVENTION

1. Field of the Invention

The present invention relates to a device for measuring extrasurface shape and intrasurface shape by scanning with a laser beam.

2. Description of the Related Art

It has been increasingly urged to measure the extrasurface shape which is a change in the direction of height of a precisely machined sample maintaining a precision of 1 nm, as well as to measure the intrasurface shape such as the size and shape of a pattern or configuration of areas formed by different materials, respectively, formed on the surface, maintaining a precision of 10 nm. A method which utilizes optical interference has been employed for measuring extrasurface shapes such as surface coarseness and the like, and an optical heterodyne interference method is effective in highly precise measuring of a very small change in height. This method consists of forming beat signals of a differential frequency by interference between two laser beams of different frequencies, and detecting a change in the phase of beat signals maintaining a resolution of about $1/500$ wavelength to measure a change of the surface in the height direction. This change in the phase corresponds to a difference in the length of optical path between the two beams. Among the optical heterodyne interference methods, a differential heterodyne interference method invented by the present inventors has been described in Japanese Patent Publication No. 44243/1991 entitled "Device for Measuring Surface Shape by the Optical Heterodyne Interference Method", according to which two beams of different frequencies are generated by driving an acousto-optical element with electric signals of two frequency components in order to detect a change in phase between the two beams.

For measuring the intrasurface shapes, there has been widely employed a method according to which the surface is scanned with a laser beam which is focused into a tiny spot, and a change in the intensity of light reflected from the sample is detected. When the surface is constituted by a plurality of members having different reflection factors, the intensity of the reflected light undergoes a change depending upon the distribution of reflection factors. A change in the intensity of the reflected light caused by the change in the reflection factor is calculated to detect an edge which is a boundary at which the reflection factor changes, and the size and shape of the pattern are measured from a change in the edge position. In particular, a laser scanning-type confocal microscope has been used in a variety of fields since it is capable of obtaining inner surface resolution greater than that of ordinary microscopes. This method consists of detecting (confocal detecting) the light reflected from the sample through a pinhole, and the scattering light that becomes noise is cut off in order to increase the inner surface resolution. Moreover, the confocal microscope is capable of measuring a change in the height in the direction of the focal point since it detects the intensity of light reflected from the position of focal point of the spot beam at which it falls on the sample. In this case, the sample is moved by a pulse stage or the like in the direction of the optical axis, and the data related to the intensity of the reflected light detected at each of the positions are processed in order to measure the intrasurface and extrasurface three-dimensional shapes.

However, though the above-mentioned laser scanning-type confocal microscope is capable of measuring the intrasurface and extrasurface shapes, the sample must be moved by a mechanical stage when the extrasurface shape is to be measured. Moreover, since the focal depth of the spot light falling on the sample is relatively shape is about 0.1 μm. With the laser scanning-type great, the resolution for measuring the extrasurface shape is about 0.1 μm. With the laser scanning-type cofocol microscope, therefore, it is not allowed to measure a change in the extrasurface shape which is as small as about 10 nm. The optical heterodyne interference makes it possible to measure a change in the extrasurface shape of about several nm but does not make it possible to measure the intrasurface shape.

That is, the phase detection based on the above-mentioned conventional optical heterodyne interference method makes it possible to detect a change in the direction of height on the extrasurface but does not make it possible to detect a change in the intrasurface shape. This is because, the phase date include only the data related to the lengths of optical paths in the direction of height. With the method of detecting a change in the intensity of the reflected light, on the other hand, a change in the intrasurface shape can be detected but a change in the extrasurface shape cannot be detected. This is because, when a change in the direction of height of the surface is within the focal depth of the irradiated light, the intensity of the reflected light remains constant with respect to a change in the direction of height. Therefore, it is not possible to simultaneously measure by using one measuring device the extrasurface shape and the intrasurface shape of a sample that has a shape changing on the extrasurface and on the intrasurface. That is, separate measuring devices have been used depending on the purpose of measurement. It is therefore an object of the present invention to realize a measuring device of a novel constitution which is capable of simultaneously measuring the intrasurface shape and the extrasurface shape maintaining high precision by solving the aforementioned problems.

SUMMARY OF THE INVENTION

In order to achieve the above-mentioned object, the present invention provides an optical device for measuring surface shape which basically has the technical constitution described below.

That is, according to a first aspect of the present invention, there is provided an optical device for measuring surface shape wherein a laser beam emitted from a source of laser beam is permitted to be incident upon an acousto-optical element which generates at least two beams of different frequencies, the two beams are permitted to fall on and scan the surface of a sample using a suitable optical system, at least part of the light reflected by the surface of the sample is split by a splitter and is detected by a suitable light-receiving means to form a reflected light beat signal, a change in phase between the reflected light beat signal and a predetermined reference beat signal is detected by a phase comparator means, the extrasurface shape sample in the direction of height of the surface thereof is calculated by an extrasurface shape calculation means and, at the same time, the reflected light that has passed through said splitter is reflected by another splitter, the intensity in the intensity distribution of the reflected light is detected by another light-receiving means to form a reflected light intensity signal, the intrasurface shape of said sample is calculated by an intrasurface shape calculation means based upon a change in the intensity of said reflected light intensity signal, and said extrasurface shape and said intrasurface shape are measured by the same device.

According to a second aspect of the present invention, there is provided an optical device for measuring surface shape wherein a laser beam emitted from a source of laser beam is permitted to be incident upon an acousto-optical element which generates at least two beams of different frequencies of which the distribution of resultant intensities is variable, at least part of the intensity of the two beams is reflected by a beam splitter and is detected by a first light-receiving means to form a reference beat signal of an AC component, at least the two beams that have passed through said beam splitter are focused into tiny spots through an objective lens and are permitted to fall on and scan the surface of a sample of which the extrasurface shape and the intrasurface shape are to be measured, part of the light reflected by said sample is reflected by said beam splitter and is detected by a second light-receiving means to form a reflected light intensity signal of a DC component and a reflected light beat signal of an AC component, a change in phase between said reflected light beat signal and said reference beat signal is detected by a phase comparator means, the extrasurface shape of said sample in the direction of height is measured by an extrasurface shape calculation means, the intrasurface shape of said sample is calculated by an intrasurface shape calculation means based upon a change in the intensity of DC components of said reflected light intensity signal, and said extrasurface shape and said intrasurface shape are simultaneously measured.

In the device for measuring surface shape of a sample of the present invention which employs the aforementioned constitution, the acousto-optical element generates two beams of different frequencies that travel in different directions when it is driven with electric signals of two frequency components fa±fm. The frequency fa controls the angle of diffraction of the two beams, and the frequency fm controls the angle of separation of the two beams. The two beams are scanned by the acousto-optical element, and are focused into tiny spots which are then permitted to fall on a sample, and the reflected light is detected. The reflected light signal of the two interfering beams has a DC component on which an AC component is superposed. These components are separately detected. A change in the direction of height on the extrasurface is detected relying upon an AC signal and a change in the intrasurface shape is detected from a change in the intensity of a DC signal. Thus, by using the optical heterodyne interferometer constitution, the reflected light detected by the same light-receiving unit is separated and is detected, and two operations, i.e., optical heterodyne detection and detection of the reflected light intensity are realized using one optical device.

Concretely speaking, the angle subtended by the two beams is controlled by a frequency fm; i.e., the separation into two beams increases with an increase in fm, and the state of substantially one beam is established when fm is small. In order to measure the extrasurface shape, therefore, the state of the two beams is established, in order to detect a change in phase between the AC beat signals detected by the first and second light receivers by utilizing the heterodyne interference. In order to measure the intrasurface shape, either two beams or one beam is used, and a DC reflected light intensity signal is detected using a third light receiver. The intensity is detected at a predetermined point in the beam scanning, which is a cofocol detection of the reflected light through a pinhole or the like, and features a high intrasurface resolution of measurement. Thus, the optical heterodyne interference function and the confocal microscope function are realized using a single optical device.

That is, the present invention has a principle in that when the extrasurface shape is to be measured utilizing the optical heterodyne interference, a change in the length of the optical path between the two beams is detected from a change in phase of the AC signals. In detecting the intensity of the reflected light, there are detected the distribution of resultant intensities of two beams and the intensity of the reflected light that corresponds to the distribution of reflection factors on the surface of the sample. A change in the intensity of the reflected light is calculated to detect the edge at which the reflection factor changes. The shape and size are measured from a change in the edge position and from the scanning distance of the two beams that have scanned across the edges.

In an embodiment of the present invention as will be described later, furthermore, the reflected light signal is detected by all of the first, second and third light receivers when the two beams are used for measuring the intrasurface shape. In this case, it becomes possible to simultaneously measure both the extrasurface shape and the intrasurface shape. Here, since the light receivers have been provided in the same optical device, both the extrasurface shape and the intrasurface shape can be measured by one optical device. In the present invention, as explained above, the extrasurface shape denotes a height or a depth of an irregular portion or concaved portion formed on a surface of body, to be detected, and the intrasurface shape denotes a characteristic configurations formed on the surface of the body. In this case, provision is made of a variety of polarizing elements and their polarizing axes are adjusted to set the intensity of the reflected light incident on the three light receivers to be an optimum value. When the intrasurface shape and the extrasurface shape are to be separately measured, furthermore, the shape of beam emitted from the acousto-optical element is set depending upon the kind of measurement, the intensity of the reflected light incident on the light receivers is maximized and the intensity of the reflected light incident on the light receivers not used for the measurement is minimized, in order to increase the efficiency for detecting the reflected light as well as to increase the S/N ratio of the reflected light.

BRIEF DESCRIPTION OF THE DRAWINGS

FIG. 1 is a block diagram for explaining the constitution and operation of an embodiment in a first aspect of the present invention;

FIG. 2 is a diagram of a sample that is to be measured;

FIG. 5 is a diagram illustrating the constitution of an optical system according to an embodiment of the present invention;

FIGS. 8(A) to 8(C) are diagrams illustrating examples of measurements according to the second aspect of the present invention, wherein FIG. 8(A) illustrates the constitution of a sample that is to be measured, FIG. 8(B) illustrates the detection of a phase, and FIG. 8(C) illustrates a pattern of the intensity of the reflected light;

FIGS. 12(A) and 12 (B) are graphs illustrating the results of measurement, wherein FIG. 12(A) is a graph showing a change in the intensity of the reflected light.

DESCRIPTION OF THE PREFERRED EMBODIMENTS

Figure 3A:
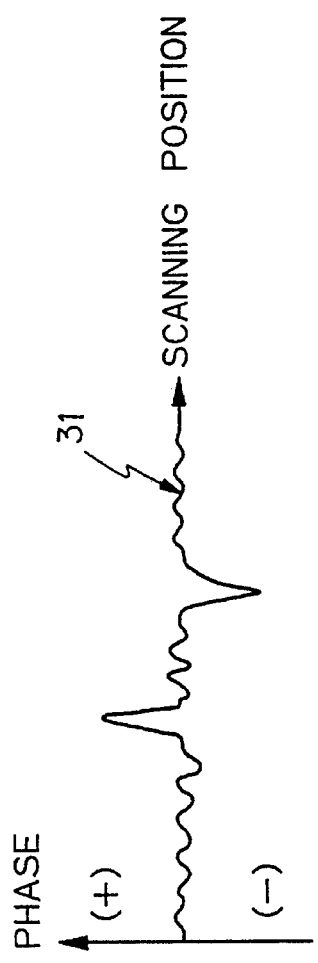
FIGS. 3(A) to 3(C) are diagrams of waveforms of detected signals of when the extrasurface shape is measured by detecting the phase of the reflected light and, at the same time, when the intrasurface shape is measured by detecting the intensity while effecting the scanning with two beams.

An optical device for measuring surface shape according to the present invention will now be described in detail with reference to the drawings.

FIG. 1 is a block diagram illustrating the structure of an embodiment for realizing the fundamental constitution of the device for measuring surface shape according to a first aspect of the present invention, and in which reference numeral 10 denotes a source of laser beam which may be, for example, an He—Ne laser, a semiconductor laser or the like and emits a laser beam 100 having linear polarization. Reference numeral 11 denotes a first beam splitter having the constitution of a polarized beam splitter which relies upon the polarization. With the axis of linear polarization of the laser beam 100 being adjusted, the laser beam is permitted by almost 100% to pass through the first beam splitter. Reference numeral 12 denotes an acousto-optical element (hereinafter abbreviated as AO) which is driven by an acousto-optical element driver (hereinafter abbreviated as AO driver) which receives signals from a first signal source 112 that generates a frequency fm and from a second signal source 114 that generates a frequency fa. Here, the frequency fm controls the shape of a beam emitted from the AO 12 and the frequency fa controls the scanning of the beam. When the frequency fm of the signals generated by the first signal source 112 is low, the AO 12 emits diffracted light of substantially one beam and when the frequency fa is high, the AO 12 emits diffracted light which is separated into two beams that have frequencies different from each other.

The two beams or one beam emitted from the AO 12 is suitably converted for its axis of polarization through a ½ wavelength board, adjusted for its intensity, and is permitted to be incident upon a second beam splitter 13. The second beam splitter 13 has the constitution of a polarized beam splitter which relies upon the polarization. The second beam splitter 13 reflects part of the intensity of the incident beam in a first direction (X-direction) and the reflected light is detected by a first light receiver 14. The beam that has passed through the second beam splitter 13 passes through a ¼ wavelength board 135, focused into a tiny spot through an objective lens 15, and is permitted to fall on and scan a sample 16 of which the extrasurface and intrasurface shapes are to be measured. The beam reflected by the sample 16 travels in the reverse direction along the optical path, and part of the intensity thereof is reflected by the second beam splitter 13 in a second direction (Y-direction) and is detected by a second light receiver 17. In this case, the axis of polarization is adjusted by the ¼ wavelength board 135, such that part of the intensity of the beam is reflected.

The reflected light signals detected by the first Light receiver 14 and the second light receiver 17 are beat signals having a frequency 2 fm which is a difference in the frequency between the two beams. The first light receiver 14 generates a reference light beat signal 145 and the second light receiver 17 generates a reflected light beat signal 175. Reference numeral 18 denotes a phase comparator which detects a phase difference between the reference light beat signal 145 and the reflected light beat signal 175. The detection is based upon the optical heterodyne interference. The phase of the reference light beat signal 145 remains constant whereas the phase of the reflected light beat signal 175 changes depending upon a difference in the optical path between the two beams falling on the sample 16. Therefore, a change in the phase of the reflected light beat signal 175 is detected by detecting the phase difference by the phase comparator 18. Reference numeral 19 denotes an extrasurface shape calculation unit which calculates the phase data from the phase comparator 18 to measure the extrasurface shape of the sample 16.

The beam having part of the intensity that has passed through the second beam splitter 13 travels in the reverse direction passing through the ½ wavelength board 125 and the AO 12, and is almost all reflected by the first beam splitter 11. Reference numeral 20 denotes a pinhole, and 21 denotes a third light receiver. Here, the pinhole 20 is directly adhered onto the surface of the third light receiver 21. The light receiver of this constitution detects the intensity of the reflected light over part of the range inclusive of the central portion in the intensity distribution of the reflected light. Therefore, the confocal detection is carried out. Moreover, this position of receiving light is a predetermined point in the beam scanning. Therefore, no matter which position on the surface of the sample 16 the probe light is scanning, the reflected light is detected at a predetermined position by the third light receiver 21 through the pinhole 20. Reference numeral 22 denotes an intrasurface shape calculation unit which calculates a change in the reflected light intensity data of DC component detected by the third light receiver 21, and detects edge positions of the sample 16 to measure the intrasurface shape.

When the intrasurface shape and the extrasurface shape of the sample 16 are to be simultaneously measured, two beams of different frequencies are emitted from the AO 12, and axes of polarization of the polarizing elements are so adjusted that the reflected light can be detected by all of the three light receivers 14, 17 and 21. When the extrasurface shape only is to be measured, the axes of polarization of the ½ wavelength board 125 and of the ¼ wavelength board 135 are adjusted, so that the reflected light is incident only upon the first light receiver 14 and the second light receiver 17. When the intrasurface shape only is to be measured, on the other hand, a maximum reflected light is permitted to be incident upon the third light receiver 21. It is also allowable to adjust the polarization and separation by providing polarizing elements such as polarizing boards other than the polarizing elements that are diagrammed.

That is, when the height is to be measured on the surface of the sample as described above by using the optical device for measuring surface shape of the present invention, the scanning is effected with two beams which are then separated by the second beam splitter 13 to form reference beat signals. One beam is permitted to fall on the surface of the sample 16, and the reflected light thereof is received again by the second beam splitter 13 and is separated to form a reflected light beat signal. A change in the phase is then detected between the reflected light beat signal and the reference beat signal to thereby measure the height.

In the above optical heterodyne system, it is desired that the axes of polarization are so adjusted that the reflected light will not be incident upon the first beam splitter.

When the intrasurface size of the sample is to be measured by using the optical device for measuring surface shape of the present invention, the scanning is effected with one beam which falls on the surface of the sample 16, and the reflected light thereof is received by the first beam splitter 11 and is separated. A change in the intensity of the reflected light is analyzed by the third light receiver 21 to measure the size.

In this operation, the second beam splitter 13 is not necessary and should, hence, be omitted from the optical path of the reflected beam.

For this purpose, the second beam splitter 13 is connected to a suitable drive mechanism. When the extrasurface shape is to be measured, the drive mechanism is actuated in order to move the second beam splitter 13 to a position off the optical path of the reflected beam.

When the second beam splitter 13 is to be moved to a position off the optical path of the reflected beam, it is desired to replace it by a transparent member such as the one composed of a glass or the like having the same shape and the same refractive index as those of the second beam splitter 13.

The aforementioned constitution will now be concretely described. In separately measuring the extrasurface shape and the intrasurface shape of the sample, when the intrasurface shape is to be measured, a single beam having a single frequency is emitted from the acousto-optical element 12. When this single beam reflected by the surface of the sample is to be received by the third light receiver 21, the second beam splitter 13 is moved off the optical light of the reflected light.

In measuring the intrasurface shape according to the present invention, furthermore, what is important is that the light reflected by the surface of the sample 16 is separated by the first beam splitter 11 and is received by the third light receiver 21 and, in this case, the first beam splitter 11 is deposed between the source of laser beam 10 and the acousto-optical element 12. According to this constitution, the reflected light necessarily passed through the confocal point, enabling the measurement to be correctly carried out.

According to the aforementioned embodiment of the present invention, it is further allowable to provide a ½ wavelength board 145 between the source 10 of laser beam and the first beam splitter 11.

In the above-mentioned embodiment, the reference beat signals are formed by partly separating the two beams emitted from the acousto-optical element 12 through the second beam splitter 13. However, the present invention is not necessarily limited to the above constitution, and the reference beat signals may be formed by any means.

For instance, the reference beat signals may be directly generated from a signal source that drives the acousto-optical element. More concretely, there may be used, as the reference beat signals, AC signals having a frequency 2 fm which is equal to twice as great as the difference of frequency between the first signal fa and the second signal fm that are fed to the acousto-optical element to drive it.

According to the above-mentioned embodiment of the present invention, the intrasurface shape can be measured to an accuracy of the order of microns when the scanning is effected with two beams and to an accuracy of the order of submicrons when the scanning is effected with one beam.

As a further constitution, the present invention provides an optical device for measuring surface shape wherein a laser beam emitted from a source of laser beam is permitted to pass through a first beam splitter and to be incident upon an acousto-optical element which generates at least two beams of different frequencies to effect the scanning, the beams are separated into two directions through a second beam splitter, a first beam that travels in a first direction being reflected by the second beam splitter is detected by a first light receiver which forms a reference beat signal, the beam that travels passing through the second beam splitter is focused into a tiny spot through an objective lens and is caused to fall on and scan the surface of a sample of which the shape is to be measured, part of the light reflected by the sample is reflected by the second beam splitter in a second direction different from the first direction and is detected by a second light receiver which forms a reflected light beat signal, a change in the phase between the reflected light beat signal and the reference beat signal is detected by a phase comparator, the extrasurface shape of the sample in the height direction is calculated by an extrasurface shape calculation means, the reflected light that has passed through the second beam splitter is reflected by the first beam splitter, part of the reflected light having a predetermined distribution of reflected light intensities is detected by a third light receiver which forms a reflected light intensity signal, the intrasurface shape of the sample is calculated by an intrasurface shape calculation means based on a change in the intensity of the reflected light intensity signal, and the extrasurface shape and the intrasurface shape are simultaneously measured. The invention further provides an optical device for measuring surface shape wherein a laser beam emitted from a source of laser beam is permitted to pass through a beam splitter and to be incident upon an acousto-optical element which generates at least two beams of different frequencies to effect the scanning, the beams effecting the scanning are focused into tiny spots through an optical system inclusive of an objective lens and are caused to fall on and scan the surface of a sample of which the shape is to be measured, at least part of the light reflected by the sample is detected by a suitable light receiver which forms a reflected light beat signal, a change in the phase between said reflected light beat signal and a reference beat signal obtained from a signal source that drives the acousto-optical element is detected by a phase comparator, the extrasurface shape of the sample in the direction of height is calculated by an extrasurface shape calculation means, the reflected light is reflected by the beam splitter, part of the reflected light having a predetermined distribution of reflected light intensities is detected by a light receiver different from the light receiver to form a reflected light intensity signal, the intrasurface shape of the sample is calculated by an intrasurface shape calculation means based on a change in the intensity of the reflected light intensity signal, and the extrasurface shape and the intrasurface shape are simultaneously measured.

The procedure for simultaneously measuring the extrasurface shape and the intrasurface shape according to the aforementioned first aspect of the present invention will now be described below with reference to FIGS. 2 to 4.

FIG. 2 illustrates a shape of a sample 16 which is to be measured for its extrasurface shape and intrasurface shape simultaneously. The sample 16 consists of a substrate portion 25 having a reflection factor Rs and a dimensional portion 26 having a reflection factor Rm. There exist protruding steps h of about 0.1 µm between the dimensional portion 26 and the substrate portion 25. The surface of the sample is scanned with two beams 27 and 28 which are focused into tiny spots. The distances between the peaks of the two beams 27 and 28 are controlled by an AC signal of a frequency fm generated from the first signal source 112. The distances between the peaks are set to be nearly equal to the diameters of the individual beams. Moreover, the frequency fa generated from the second signal source 114 is changed to effect the scanning with the two beams 27 and 28.

FIG. 3 (a), 3(b) and 3(c) shows examples of signal waveforms that are detected. The waveform 31 shown in FIG. 3(A) is that of a change in phase of the reflected light detected by the second light receiver 17. According to this constitution, the optical heterodyne interference is of the differential type which detects a difference in the optical path between the two beams 27 and 28. Therefore, the detected phase represents the differentiation of the surface of the sample 16. When the source of laser beam is an He—Ne laser, one degree of phase represents a difference of 0.88 nm in the optical path. In a portion where steps exist at the edges between the substrate portion 25 and the dimensional portion 26, therefore, the phase varies depending upon the steps. A change in phase on the surfaces of the substrate portion 25 and the dimensional portion 26 represents the surface coarseness on the surfaces thereof. Here, a positive sign of the phase represents that the surface between the two beams 27 and 28 is protruding and a negative sign of the phase represents that the surface is recessed. The thus obtained phase data are then integrated by the extrasurface shape calculation unit 19 to measure the surface topography.

Figure 3B:
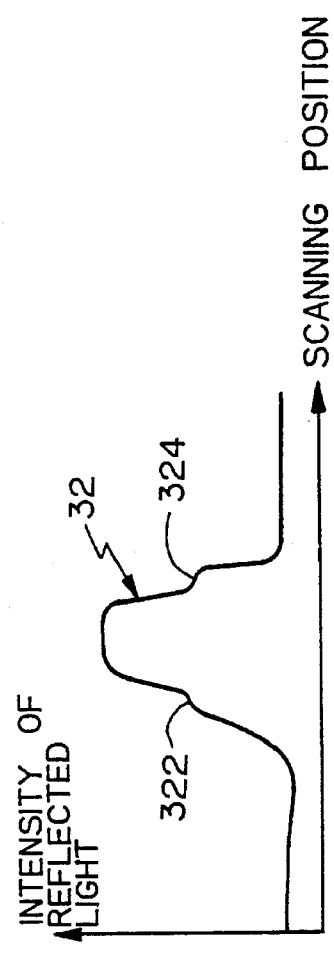
Figure 3C:
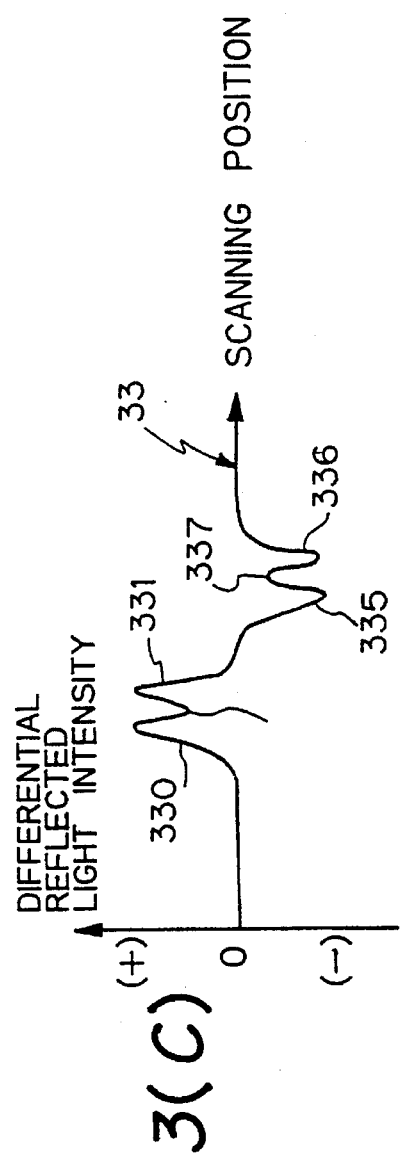

The waveform 32 shown in FIG. 3(B) represents a reflected light intensity pattern signal that is detected by the third light receiver 21 when the scanning is effected with two beams 27 and 28. The surface reflection factors of the members hold a relationship Rm>Rs. The waveform 32 includes a change in the intensity at the central portions 322 and 324 of intensity. The waveform 33 shown in FIG. 3(C) is a differential intensity waveform of the reflected light intensity pattern signal 32. Detection is made of the position of a peak 332 between the two rising peaks 330 and 331 and the position of a peak 337 between the two breaking peaks 335 and 336. The peak positions 332 and 337 represent the state where the edge positions of the substrate portion 25 and of the dimensional portion 26 are irradiated with a central portion of the intensity distribution of the two beams. The intrasurface shape calculation unit 22 detects the edge positions. The size is measured from the scanning amount of the two beams between the edge positions, and the shape is measured from a change in the edge positions.

Figure 4A:
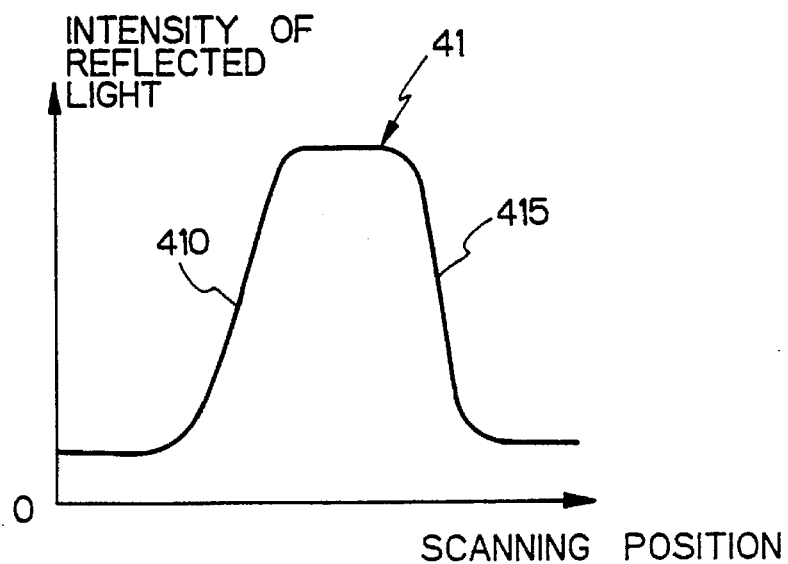
FIGS. 4(A) and 4(B) are a diagram of a waveform of a reflected light intensity signal that is detected during the intrasurface shape measurement while effecting the scanning with one beam and a diagram of a signal waveform of when the differential processing is effected.
Figure 4B:
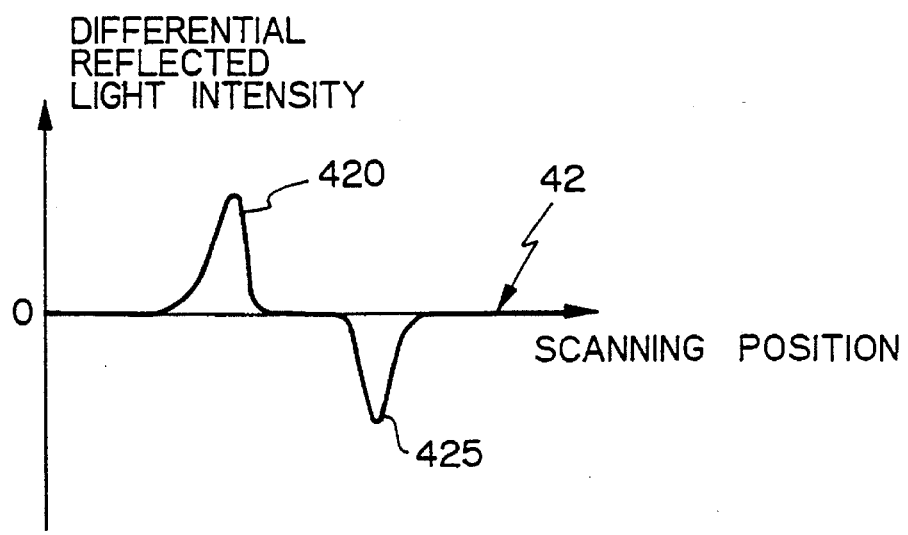

When the extrasurface shape and the intrasurface shape are to be separately measured, there may be employed the scanning with two beams as explained with reference to FIG. 3. In particular, the intrasurface shape can be measured utilizing the scanning with one beam. FIG. 4 shows an example of detecting an edge when the scanning is effected with one beam. The sample is the same as the one shown in FIG. 2. The waveform 41 of FIG. 4(A) represents a reflected light intensity signal. The rising part 410 and breaking part 415 of the waveform monotonously increases and monotonously decreases. The waveform 42 of FIG. 4(B) is a differential intensity signal waveform which is obtained by subjecting the waveform 41 to the differentiation processing. Two peak intensity positions 420 and 425 are detected. The peak intensity positions represent the state where the edges are irradiated with beams of peak intensities at positions where the rate of change in the reflected light intensity is maximum.

FIG. 5 illustrates another concrete constitution of the optical system in the device for measuring surface shape according to the present invention. A laser beam emitted from the source 10 of laser beam passes through the first beam splitter 11, and is converted into a sheet beam which spreads over a plane in parallel with the paper through a combination of a cylindrical lens 50 and a convex lens 51, and is incident on the AO 12 which generates a probe light that corresponds to the frequency fm as mentioned earlier. The probe light coming out of the AO 12 is converted again into a circular beam through the ½ wavelength board 125, a convex lens 52 and a cylindrical lens 53. The probe light traveling as a diverging light is split into two directions by the second beam splitter 13. The reflected light having part of the intensity is focused through a convex lens 54 and is detected by the first light receiver 14. The passing light is collimated through a convex lens 55, passes through the ¼ wavelength board 135, focused by the objective lens 15, and is caused to fall on and scan the surface of the sample 16. The light reflected by the sample 16 is partly reflected by the second beam splitter and is detected by the light receiver 17. The reflected light that has passed through the second beam splitter 13 is reflected by the first beam splitter 11, focused through a convex lens 56, and is detected by the third light receiver 21 provided with a pinhole. The optical system of the above-mentioned constitution makes it possible to simultaneously measure the intrasurface shape and the extrasurface shape.

As described above, the optical device of the present invention which is provided with the optical heterodyne interference function and the confocal scanning microscope function, makes it possible to simultaneously measure the extrasurface shape maintaining a precision of 1 nm and the intrasurface shape maintaining a precision of 10 nm. The two beams emitted from the acousto-optical element can be freely controlled for their intensity distribution. Therefore, the conditions of the two beams can be set depending on the purpose of measurement to carry out a wide range of measurement. The reflected light intensity signal needs be simply processed. Therefore, the measurement can be taken in real time using a simply constituted operation unit. Moreover, the two beams falling on the sample travel through nearly the same optical paths and are hardly affected by the disturbance, making it possible to take stable measurement that is suited for in-line measurement in the production line.

Next, the concrete constitution of the device for measuring surface shape according to the second aspect of the present invention will be described with reference to the drawings. That is, the fundamental constitution of the second aspect of the present invention is as described above, and FIG. 6 is a block diagram illustrating the structure of an embodiment thereof.

Figure 6:
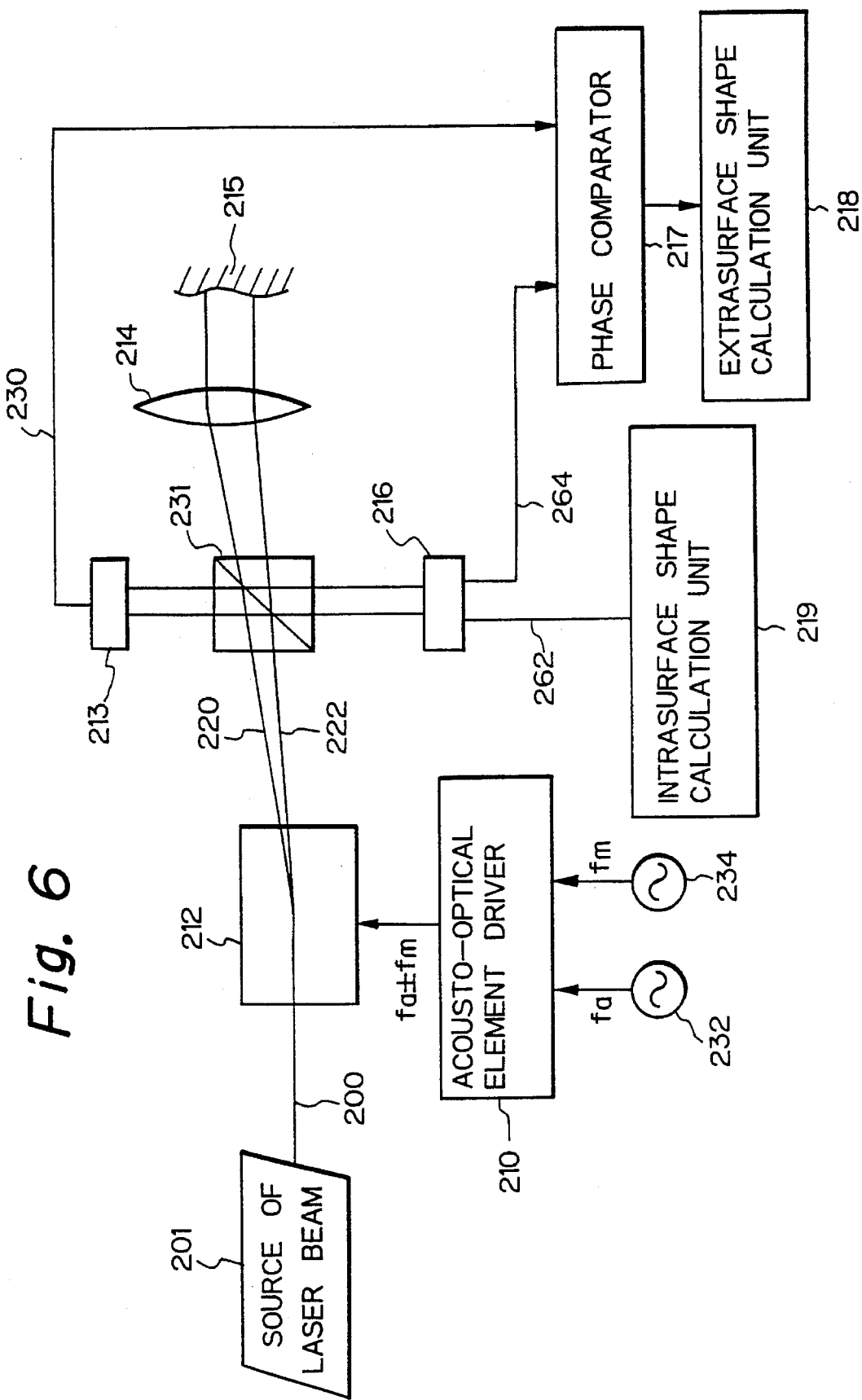
FIG. 6 is a block diagram of a system for explaining the constitution and operation of an embodiment in a second aspect of the present invention.

FIG. 6 is a block diagram illustrating the constitution of the present invention wherein reference numeral 201 denotes a source of laser beam which is constituted by, for example, a He—Ne laser, a semiconductor laser or the like, and emits a laser beam 200 having linear polarization, and 211 denotes an acousto-optical element (hereinafter abbreviated as AO) which is driven by an acousto-optical element driver 210 that receives signals from a first signal source 232 that generates AC signals of a frequency fa and from a second signal source 234 that generates AC signals of a frequency fm. The acousto-optical driver 210 forms a drive signal having two frequency components fa±fm and drives the AO 212 to generate two beams 220 and 222 that have different frequencies and that travel in different directions. The frequency fm controls the angle of separation between the two beams 220 and 222, and the frequency fa controls the angles of diffraction of the two beams. The two beams 220 and 222 emitted from the AO 212 are split into two directions by a beam splitter 231.

The two beams having an intensity of about 20% reflected by the beam splitter 231 are detected by a first light receiver 213 which forms a reference light beat signal 230 of AC component. The two beams that have passed through the beam splitter 231 are focused through an objective 214 and are permitted to fall on and scan the surface of a sample 215 whose extrasurface shape and intrasurface shape are to be measured. The two beams reflected by the sample 215 are further reflected by the beam splitter 231 and are detected by a second light receiver 216 which forms a reflected light intensity signal 262 having a DC component and a reflected light beat signal 264 having an AC component. Reference numeral 217 denotes a phase comparator which detects a phase difference between the fererence light beat signal 230 and the reflected light beat signal 264. Here, the phase of the reference light beat signal 230 remains constant but the phase of the reflected light beat signal 264 changes depending upon a difference in the optical path between the two beams on the surface of the sample 215. Therefore, the phase data detected by the phase comparator 217 corresponds to a change in the height of the surface of the sample 215. Reference numeral 218 denotes an extrasurface shape calculation unit which stores the phase data detected in one period of scanning, processes the phase data and judges the extrasurface shape.

Reference numeral 219 denotes an intrasurface shape calculation unit which stores the DC reflected light intensity detected in one period of scanning, calculates the change in the intensity of the reflected light, and measures the intrasurface shape. The scanning with two beams is effected maintaining a step of, for example, 0.01 μm, and the reflected light signal is detected for each of the scanning positions. The intensity of the reflected light changes depending upon the distribution of intensities of the two beams scanning the surface of the sample 215 and the distribution of reflection factors on the surface of the sample 215. The change in the reflected light intensity is subjected to the differentiation processing to detect the edge position which is a boundary at which the reflection factor changes based upon a peak position in the change of the differential intensity and, hence, to detect a change in the intrasurface shape of the sample 215.

Described below is the detection of the reflected light. When the two beams 220 and 222 are interfered by each other, there is detected a reflected light signal having an intensity $I = A1^2 + A2^2 + 2A1A2 \cos(2\pi\Delta f t + \Delta\phi)$ where A1 and A2 denote amplitudes of the two beams 220 and 222, f1 and f2 denote frequencies, and $\phi 1$ and $\phi 2$ denote phases. The DC component is given as $A1^2 + A2^2$ which varies in response to the intensity of the reflected light. In heterodyne interference, so far, the DC component was simply regarded as a bias term and was considered to be useless for the measurement. However, since the intensity of the reflected light changes depending upon the reflection factor of the surface at a position irradiated with the two beams, the DC component gives effective data for measuring the intrasurface shape. The AC component is given by $2A1A2 \cos(2\pi\Delta f t + \Delta\phi)$ and the frequency by 2 fm. Since detection of the phase of the beat signal is not affected by the amplitude 2A1A2, the change in the height can be detected irrespective of the intrasurface distribution of the surface.

Figure 7:
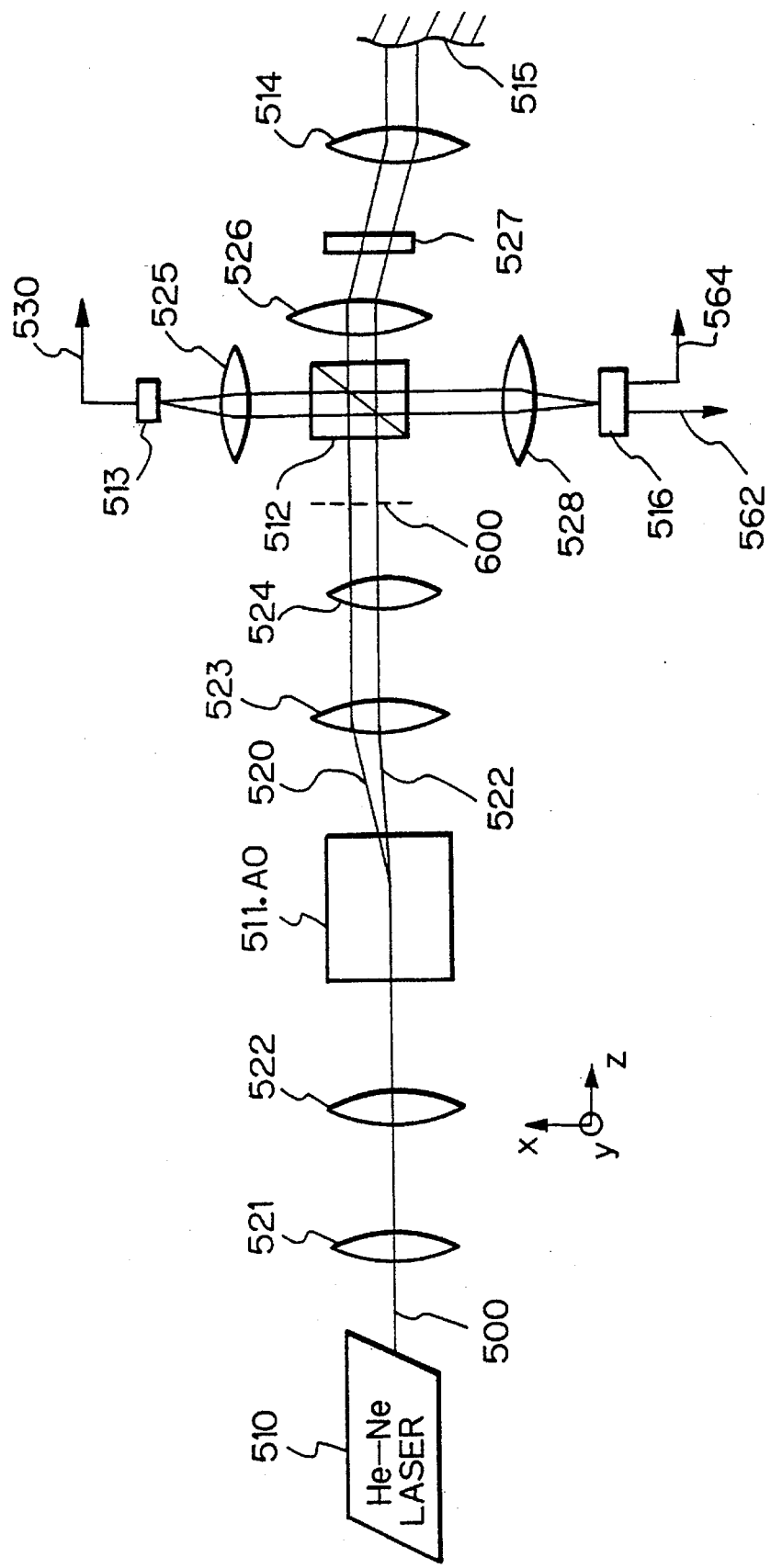
FIG. 7 is a diagram illustrating the constitution of a scanning optical system which effects the two-beam scanning according to the second aspect of the present invention.

FIG. 7 illustrates an optical system which executes the two-beam scanning that constitutes the device for measuring surface shape of the present invention. A laser beam 500 emitted from a source of He—Ne laser 510 is converted into a sheet-like beam which spreads over a plane in parallel with the paper and is focused into a plane perpendicular to the paper via a combination of a cylindrical lens 521 and a convex lens 522, and falls on an AO 511. The sheet-like beam is used in order to increase the diffraction efficiency of the AO 511. Two beams 520 and 522 are generated from the AO 511 and are scanned in the direction of X-axis. The two beams having the sheet-like shape are converted again into circular beams through a convex lens 523 and a cylindrical lens 524. Here, the refracting surface of the cylindrical lens 524 is set to be in the direction of Y-axis. The zero-order diffracted light is cut off at a position of focal point 600 where the beams are converted into circular beams, and the first-order diffracted light only is permitted to pass through.

The two beams travelling as circular diverging lights from the focal point 600 are reflected for part of their intensity (about 20%) by the beam splitter 512, and are focused through a convex lens 525 and are detected by a first light receiver 513 that generates a reference light beat signal 130. When the laser beam 500 emitted from the source of laser beam 510 is linearly polarized, the beam splitter 512 should be of the polarizing type. The two beams that have passed through the beam splitter 512 are collimated through a convex lens 526, pass through a ¼ wavelength board 525, focused into tiny spots through an objective 514, and are permitted to fall on and scan the surface of the sample 515. The light reflected by the sample 515 is reflected by the beam splitter 512, focused through a convex lens 528, and is detected by a second light receiver 516 which generates an AC beat signal 564 and a DC reflected light intensity signal 562. The scanning with the two beams is thus effected by the above-constituted optical system, and the reference light signal and the reflected light signal are formed. The change in the angle of diffraction of the AO 511 used in the present invention is 3.25 mrad, and the scanning can be carried out with a step of 0.01 μm by dividing the angle of diffraction into 1/2000.

Figure 8A:
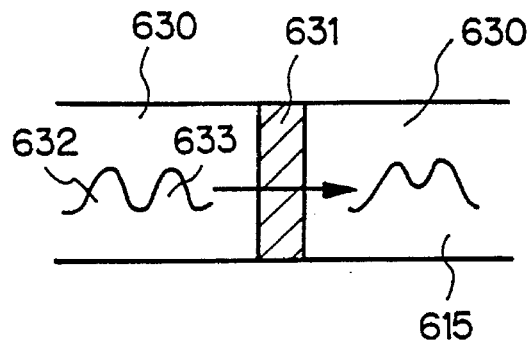

FIG. 8 shows the measurement of the extrasurface shape and the intrasurface shape according to the present invention. FIG. 8(A) shows a gap of a magnetic head which is a sample 615, and wherein reference numeral 630 denotes a track portion and 631 denotes a gap portion which is important for effecting the operation of writing and reading the magnetic data. The track portion 630 and the gap portion 631 are made of different materials and when the surface is to be polished, the gap portion 631 is recessed below the surface of the track 630 by several tens of nm. Since the recessed step greatly affects the magnetic characteristics, it is important to measure the recessed step of the gap which is a change in the extrasurface direction. Furthermore, the width of the gap 631 in the intrasurface direction is about 0.5 µm and affects the magnetic characteristics. It is therefore also important to measure the size of the gap. The surface of the magnetic head is scanned with two beams 632 and 633. The scanning is effected while maintaining the distance between the peak intensities of the two beams 632 and 633 to be equal to nearly the spot diameters of the individual beams. According to the present invention, it is allowed to simultaneously measure the recessed step of the gap and the width of the gap.

Figure 8B:
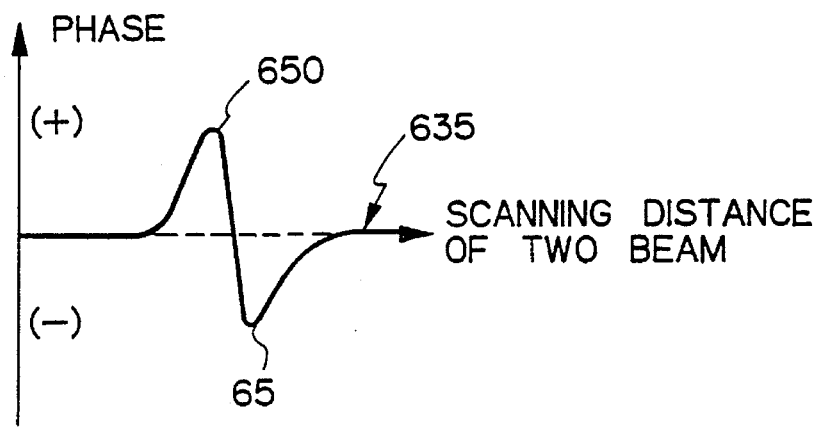
Figure 8C:
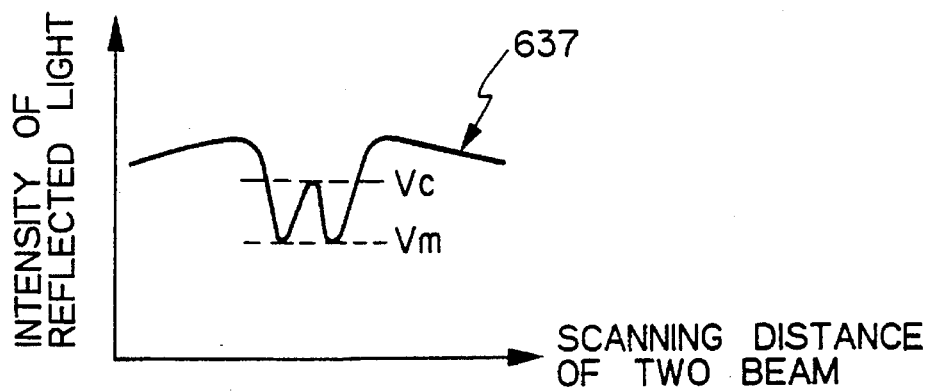
Figure 9:
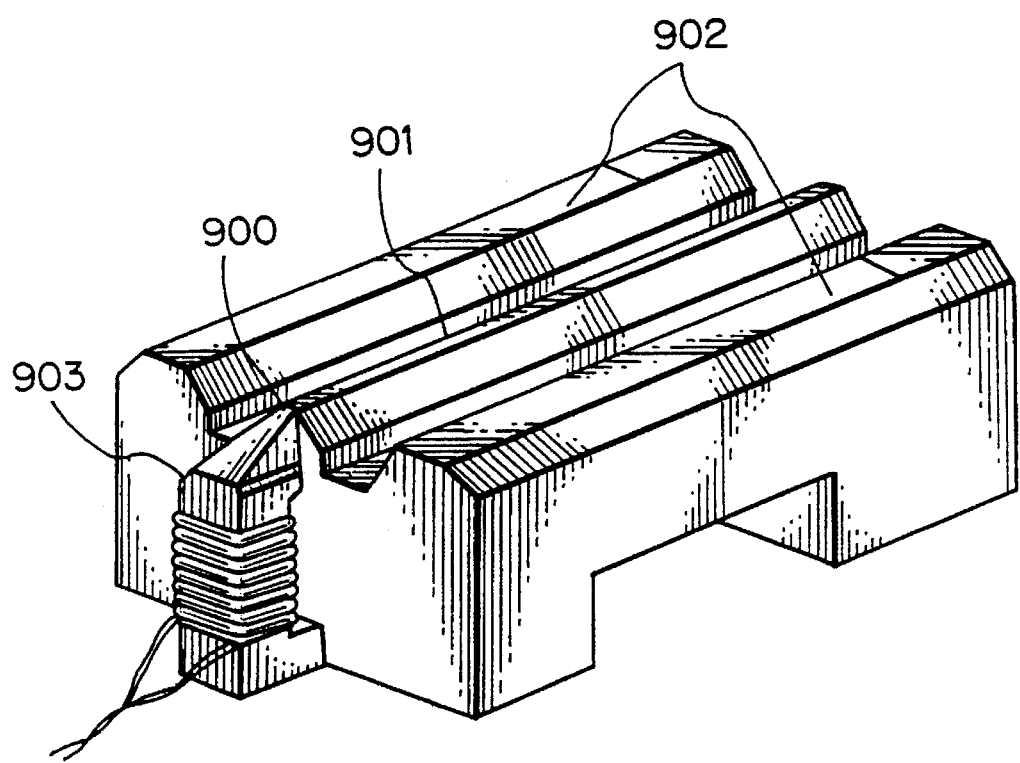
FIG. 9 is a diagram illustrating an object to be measured of the present invention.

FIG. 9 schematically shows the constitution of the magnetic head which is used as a sample in the above-mentioned embodiment of the present invention. That is, a core portion 903 is disposed between slider portions 902, and the upper surface of the core portion 903 is constituted by a gap portion 900 that corresponds to a portion designated at 631 in FIG. 8 and track portions 901 (that correspond to portions 630 of FIG. 8) formed on both sides thereof. Here, the object of measurement includes the width and depth of the gap portion.

FIG. 8(b) illustrates an example of detecting the phase in measuring the recess of the gap. A waveform 635 represents a change in phase of the AC signal that is detected when the above-mentioned head is scanned with two beams, wherein the change in phase becomes the greatest at positions 650 and 652 where there exist steps between the tracks 630 and the gap 631. This is because the difference in the optical path between the two beams becomes a maximum at the steps. At this moment, one beam is on the surface of the track 630 and the other beam is falling on the gap 631. This change in phase Δφ and the difference in the optical path Δh establish a relationship Δh=λΔφ/4π, where λ denotes the wavelength of a laser beam. Therefore, the recessed step of the gap can be measured from a change in phase at positions 650 and 652 that correspond to the phase of the tracks 630 that serve as a reference.

FIG. 8(c) illustrates an example of detecting the intensity of the reflected light in measuring the gap width. A waveform 637 represents a reflected light intensity pattern signal that is obtained when the head is scanned with two beams, i.e., represents a change in the DC component of the reflected light obtained in one period of scanning. When the reflection factor Rt of the track 630 is greater than the reflection factor Rg of the gap 631, the waveform 637 assumes a W-shape exhibiting a maximum intensity Vm and a minimum intensity Vc at two points. The extremum intensities Vm and Vc are detected, and the size of the gap 631 is measured from the correlation of these intensities. It is also possible to measure a change in the reflection factor of the gap 631 together with the measurement of the size. Such a W-shaped pattern is obtained only by using two beams. The calculation of size from the W-shaped pattern has been closely described in Japanese Patent Application No. 22982/1987 filed by the present inventors.

Described below in detail is a concrete procedure for simultaneously measuring the depth and width of the gap portion in the magnetic head of FIG. 9, i.e., for simultaneously measuring the step of gap and the size of gap in compliance with the aforementioned embodiment of the present invention.

Figure 10:
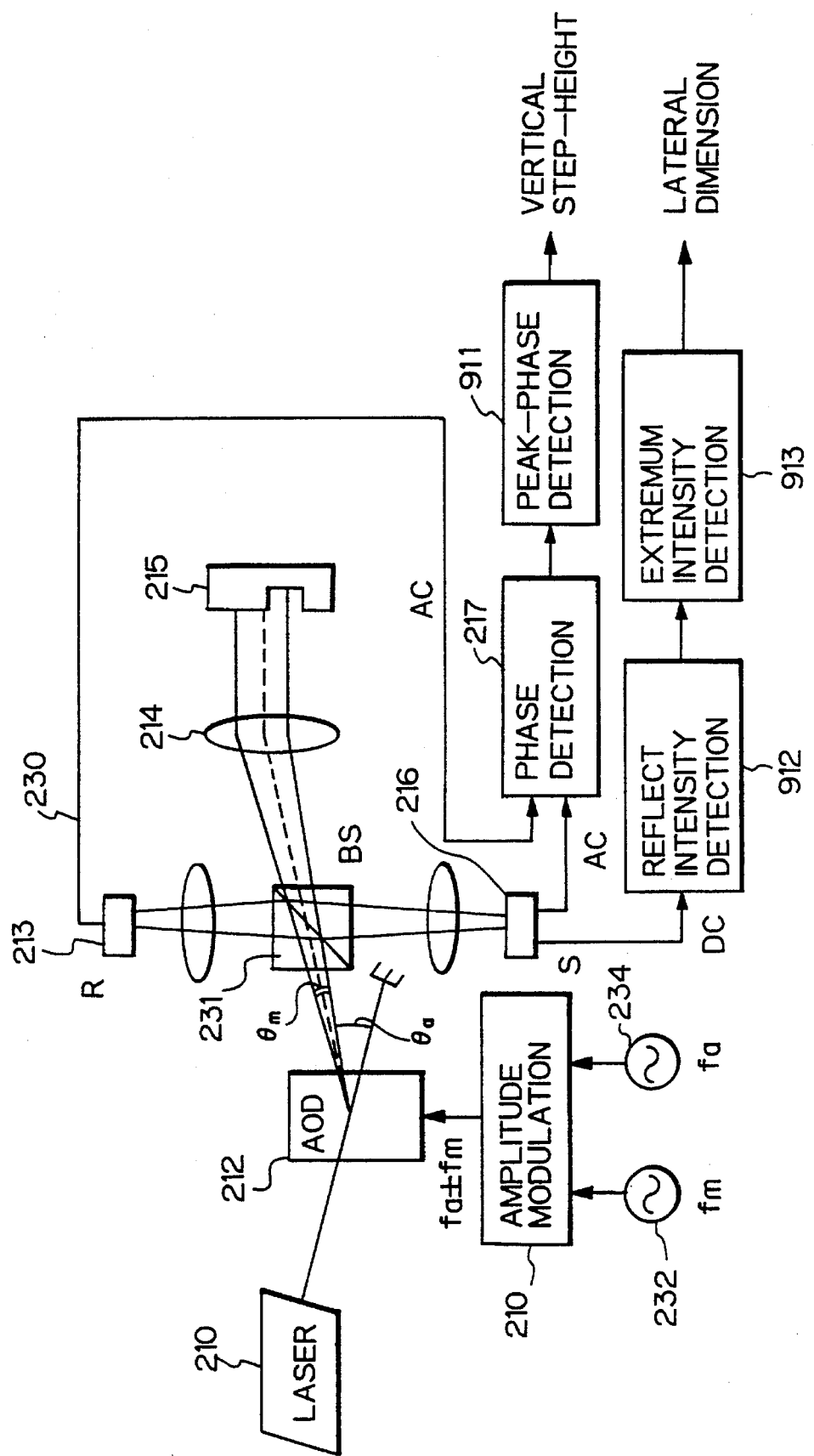
FIG. 10 is a block diagram illustrating the constitution of a measuring device according to the second aspect of the present invention.

FIG. 10 is a block diagram of the optical device for measuring surface shape according to the second aspect of the present invention. The fundamental constitution is nearly the same as the constitution of FIG. 6, and the same portions are denoted by the same reference numerals as those used in FIG. 6 and are not described here, but the portions which are different from those portions shown in FIG. 6 are denoted by different reference numerals.

In the constitution of FIG. 10, a peak-phase detector means 911 is provided being connected to a phase detector means 217 which includes a phase comparator. Moreover, there are provided a reflected light intensity detector means 912 and an extremum value intensity detector means 913 in place of the intrasurface shape calculation means 219 of FIG. 6.

In the thus constituted optical device for measuring surface shape, the DC component represents the reflected light intensity at a position where the two beams are incident, and varies depending on a distribution of resultant intensities of the two beams obtained by synthesizing the distribution of reflection factors of the surface and the Gaussian distribution. In the heterodyne interference, the phase is chiefly detected. As an example of detecting the intensity, there can be mentioned an optical heterodyne laser microscope. This microscope measures the intensity of the AC component of when the wave front of the reference light comes in agreement with the wave front of the reflected light. The DC component, however, is simply regarded as a bias term and is not used for the measurement. The DC component $A1^2 + A2^2$ in the measuring system changes in proportion to the sum of square power, which makes it possible to measure the distribution of reflection factors on the surface maintaining better sensitivity than the AC amplitude $2A1A2$ which changes in proportion to the product.

When the sample is scanned with two beams, the intensities of the reflected light detected at each of the scanning positions are stored in the memory circuit. A reflected light intensity pattern signal having a particular W-shape is detected in one period of scanning. In the reflected light intensity pattern signal, values of the reflected light intensities are detected at the center of the two beams and at a central position of the gap irradiated with the peak intensity of the beam. These intensities are obtained at positions where the intensity of the reflected light intensity pattern signal changes at an extreme rate, and have a maximum intensity and a minimum intensity. The extremum intensities assume specific values depending upon the size of the gap and the difference in the reflection factor, and can be converted into a size.

The AC signal component is a beat signal of a frequency 2 fm and is detected by an ordinary heterodyne interference. The phase $\phi_1$ of the reference light signal remains constant, and the phase $\phi_2$ of the reflected light signal changes depending upon the step of the gap. Therefore, the step is measured by detecting a change in the phase $\phi_2$ with the phase $\phi_1$ as a reference. A difference (step) Δh in the length of the optical path between the two beams and a change Δφ in the phase $\phi_1$ establish a relationship, $$\Delta h = \lambda \Delta \phi / 4\pi$$

where λ denotes the wavelength of the laser beam.

When an He—Ne laser having a wavelength of 633 nm is used, one degree of phase corresponds to 0.88 nm (1/720 wavelength). When a change in phase is detected over a range of |π|, the step can be measured up to |λ/4| (up to 0.15 µm). The phase data detected at each of the scanning positions are stored in the memory circuit as when detecting the DC reflected light intensities, and a peak value of a change in the phase is detected. The peak in the phase is obtained when the peak intensities of the two beams fall on the central position of the gap. The step of the gap is measured from a difference between the reference phase and the peak phase when the substrate portion is irradiated with the two beams.

Figure 11A:
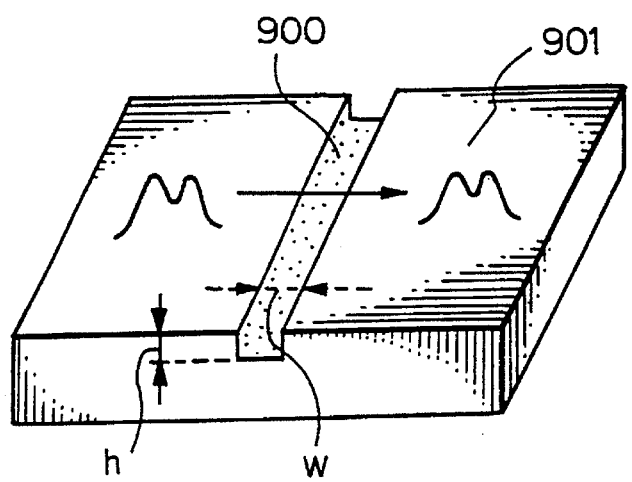
FIG. 11(A) is a diagram illustrating the state where a sample to be measured is scanned with an optical beam according to the present invention.
Figure 11B:
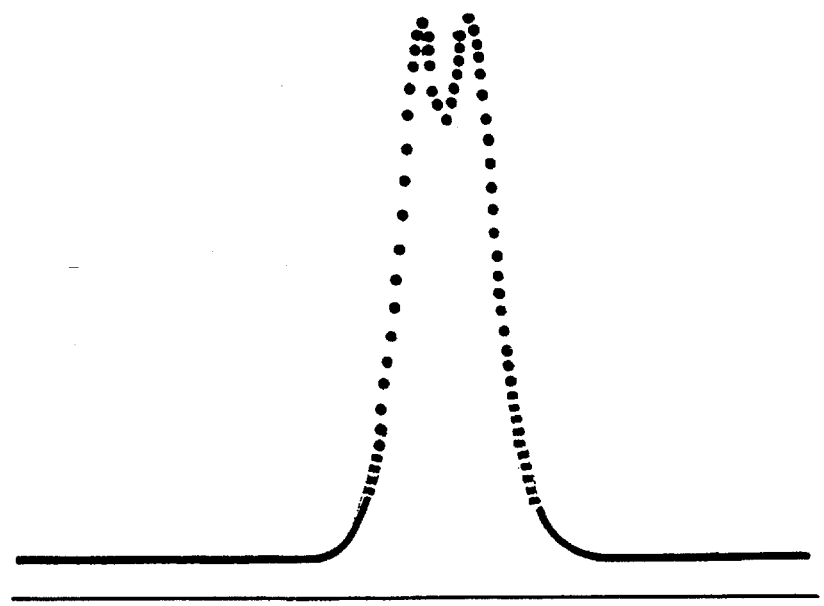
FIG. 11(B) is a diagram illustrating the distribution of intensities of the scanning beam.

FIG. 11(A) illustrates a gap shape and FIG. 11(B) illustrates a waveform of the distribution of intensities of the two beams scanning the surface thereof. The object being measured is a step and size in the gap portion formed in the track portion of the magnetic head (MH). The track portion and the gap portion are constituted by members having different reflection factors and hardnesses. When the track surface is polished, the gap portion has been recessed below the track surface by several tens of nm. In order to enhance the magnetic redording characteristics, it is essential that the step is small and the width of the gap is of the order of submicrons.

If the step h of the gap 900 in the magnetic head being measured is 17 nm and the width W of the gap is 0.76 μm, then it is desired that the two beams each have a diameter of 2 μm (at a point of 13.5% intensity) and the resultant distribution of intensities assumes the M-shape when the distance between the peak intensities is set to be about 1.5 μm. The frequency fm at this moment is 250 kHz. The scanning is effected with the two beams maintaining a step of 0.02 μm.

That is, according to the present invention, when the two beams each have a diameter D (D is a distance between the 13.5% intensity points of maximum intensity), the distance between the peak intensities of the two beams is set to be 70 to 80% of the diameter D. The distance is set at the frequency fm. This is to increase the sensitivity of the extremum intensity of the W-shaped pattern when a DC component is detected.

In the present invention, furthermore, the scanning with the laser beams is effected maintaining a step of from 0.01 to 0.02 μm. This scanning is realized by changing the frequency fa that controls the AOD as described above.

Figure 12A:
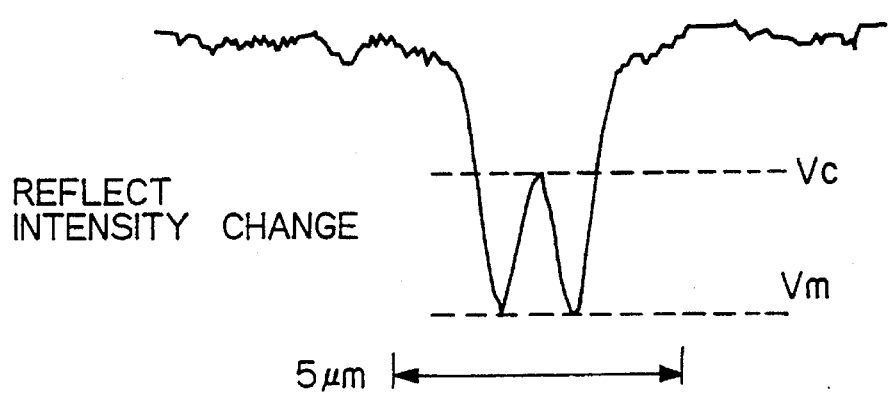
Figure 12B:
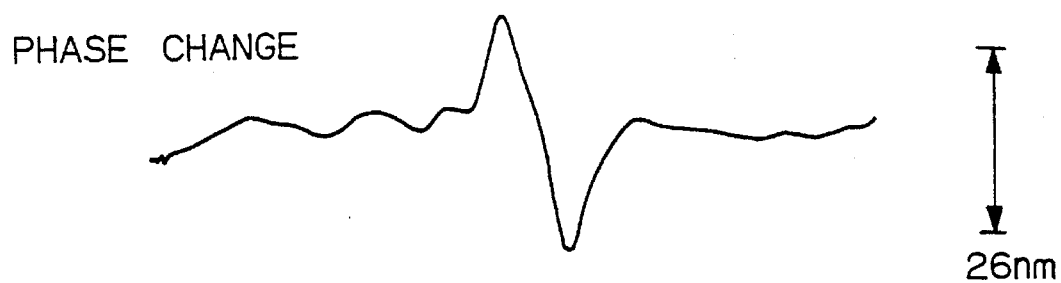
FIG. 12(B) is a graph showing a change in the phase.

FIG. 12 shows a change in the phase and a change in the intensity of the reflected light when the gap of the magnetic head is measured using the measuring method according to the aforementioned embodiment of the present invention, and wherein FIG. 12(A) shows a change in the intensity and FIG. 12(B) shows a change in the phase. That is, this measurement is of the differential type, and the phase that is obtained is the differentiation of a change in height. The phase difference between the two beams becomes the greatest when one beam is falling on the track surface and when the other beam is falling with its greatest-intensity portion on the central portion of the gap. The phase difference in this case corresponds to the step. This state of irradiation happens twice in one time of scanning forming positive and negative peaks in the change of phase. The phase difference between the peaks is 38° and its distance is 34 nm. The reference phase of when the track portion is irradiated with two beams is affected by the surface coarseness and the like. In the measurement of this embodiment, therefore, the step is measured based on a phase difference which is one-half the phase difference between the peaks. Therefore, the phase difference due to the step of gap becomes 19° or 17 nm. In this measurement, the resolution of phase detection is 0.1° (about 0.1 nm).

In measuring the step of the gap, it is important to set the distribution of intensities of the two beams so that the step of the gap is not irradiated with the region of the beam having large intensity while the peak-intensity portion of the other beam is falling on the center of the gap.

The state of substantially one beam is established when the distance between the peak intensities becomes smaller than 50% of the beam spot diameter. In this state, the peak-intensity portion of one beam is falling on the step of the gap and, at the same time, the maximum-intensity portion of the other beam is also falling on the step. In this case, the phase difference that is detected becomes smaller than the actual phase difference. In this embodiment, the distance between the two peaks in phase of the waveform of the detected phase change is equal to the distance between the peak intensities of the two beams, and it is not possible to measure the size from the phase data. If the size of the gap becomes greater than the diameter of the beam that is falling, the distance between the peaks in phase varies in proportion to the size, and it becomes possible to measure the size from the peak position of phase.

The reflected light intensity pattern signal (RIP signal) of when the DC reflected light intensity is detected exhibits a pattern of the W-shape in one period of scanning. This is because, the reflection factor at the gap portion is smaller than that of the track porion. A minimum intensity value Vm and a maximum intensity value Vc are detected from the RIP signal. Here, the extremum intensity is not an absolute value of the intensity but is a relative intensity with respect to the reference intensity of when the two beams are both falling on the track surface. The minimum intensity Vm is obtained when a maximum-intensity portion of one beam is falling on the central position of the gap and the maximum intensity Vc is obtained when the central positions of the two beams are falling on the central portion of the gap. The extremum intensity changes depending upon the intensity distribution of the two beams, gap size and reflection factors of the members, and has a specific value with respect to the size depending upon the reflection factors.

In this embodiments, the maximum intensity is Vc=91.8% and the minimum intensity is Vm=83.9%. In this case, 1% of a change in the maximum intensity Vc and in the minimum intensity Vm represents 0.08 and 0.04 μm, respectively, and the resolution for detecting the extremum intensity is 0.2% when the intensity of the reflected light is detected by a 10-bit A/D converter. The repetitive stability of measurement is ±0.02 μm in the case of the minimum intensity Vm and ±0.04 μm in the case of the maximum intensity Vc. When the reflection factor of the gap is unknown, both the maximum and minimum intensities must be detected as will be described later. When the reflection factor is known and is constant, however, the minimum intensity Vm only may be detected which can be precisely converted into a size thereby to measure the size.

In the above-mentioned embodiment, the scanning is effected while suitably setting the resultant intensity distribution of the two beams, and the AC component and the DC component in the reflected light signal are simultaneously detected in order to simultaneously measure the extrasurface shape and the intrasurface shape. Depending upon the object of measurement, however, the extrasurface shape and the intrasurface shape can be separately measured by setting resultant intensity distribution of the two beams and by separately detecting the AC signal and the DC signal of the reflected light.

According to another embodiment of the second aspect of the present invention, the optical device for measuring surface shape is constituted as described below. That is, there is provided an optical device for measuring surface shape wherein a laser beam emitted from a source of laser beam is permitted to be incident upon an acousto-optical element which generates at least two beams of different frequencies of which the distribution of resultant intensities can be varied, the two beams are at least partly allowed to pass through a beam splitter, and at least the two beams that have passed through the beam splitter are focused into tiny spots through an objective and are caused to fall on and scan the surface of a sample of which the extrasurface shape and the intrasurface shape are to be measured, the light reflected by the sample is partly reflected by the beam splitter and is detected by a light-receiving means which forms a reflected light intensity signal of DC component and a reflected light beat signal of AC component, a change in phase between said reflected light beat signal and a reference beat signal found from a signal source that drives the acousto-optical element is detected by a phase comparator means, the extrasurface shape of the sample in the direction of height is calculated and measured by an extrasurface shape calculation means, the intrasurface shape of the sample is calculated and measured by an intrasurface shape calculation means relying upon a change in the intensity of DC component of the reflected light intensity signal, and the extrasurface shape and the intrasurface shape are thus simultaneously measured.

According to this embodiment as described above, the AC component and DC component of the reflected light are separately detected using an optical device which is based upon an optical heterodyne interferometer, in order to simultaneously measure the extrasurface shape and the intrasurface shape using the same optical device. Use of the acousto-optical element makes it possible to arbitrarily set the resultant intensity distribution of the two beams, to effect precise scanning with two beams, and to take flexible and precise measurements. The reflected light intensity signals need be simply processed and can, hence, be measured in real time using a simply constituted operation unit. Moreover, the two beams falling on the sample travel along nearly the same optical paths and make it possible to obtain stable measurement without affected by disturbance lending themselves well for in-line measurement in the production lines.

I claim:

1. An optical device for measuring both the extrasurface shape and intrasurface shape of a sample, comprising:

an acousto-optical element;

a laser beam source for emitting a laser beam incident upon the acousto-optical element;

means for driving the acousto-optical element to convert the incident laser beam into at least two beams of different frequencies directed along a path to the sample;

a first beam splitter positioned in the path of the at least two laser beams between the acousto-optical element and the sample for splitting the at least two laser beams directed toward the sample and for splitting light reflected by the sample into first and second reflected split beams of light;

first light receiving means responsive to the at least two laser beams split by the first beam splitter for forming a reference beat signal;

second light receiving means responsive to the first reflected split beam of light for forming a light beat signal;

a second beam splitter positioned to reflect a portion of the second reflected split beam of light from the first beam splitter;

a third light receiving means for detecting light intensity of the portion of the second reflected split beam from the second beam splitter to form a reflected light intensity signal;

a phase comparator coupled to the first and second light receiving means for comparing the phase of the reference beat signal with the phase of the light beat signal;

an extrasurface shape calculator means coupled to the phase comparator for calculating the extrasurface shape of the sample in the direction of the height of the surface; and an intrasurface shape calculator means coupled to the third light receiving means for calculating the intrasurface shape of the sample in accordance with a change in the intensity of the reflected light intensity signal.

2. An optical device for measuring both the extrasurface shape and intrasurface shape of a sample, comprising:

an acousto-optical element;

a laser beam source for emitting a laser beam incident upon the acousto-optical element;

means for driving the acousto-optical element to convert the incident laser beam into at least two beams of different frequencies to effect scanning;

a first beam splitter positioned in the path of the at least two laser beams between the acousto-optical element and the sample for splitting and directing both of the at least two laser beams in two different directions, a first of the split beams being reflected by the first beam splitter to travel in a first direction, a second of the split beams travelling through the first beam splitter and focused into a spot through an objective lens to fall on and scan a surface of the sample, said second split beam being reflected by the sample and split by the first beam splitter into a first and second reflected split beams of light, said first reflected split beam travelling in a second direction different from the first direction;

first light receiving means responsive to the first reflected split beam of light travelling in the first direction for forming a reference beat signal;

second light receiving means responsive to the split beam travelling in the second direction for forming a light signal;

a second beam splitter positioned to reflect a portion of the second reflected split beam of light from the first beam splitter;

a third light receiving means for detecting light intensity of the portion of the second reflected split beam of light from the second beam splitter to form a reflected light intensity signal;

a phase comparator coupled to the first and second light receiving means for comparing the phase of the reference beat signal with the phase of the light beat signal;

an extrasurface shape calculator means coupled to the phase comparator for calculating the extrasurface shape of the sample in the direction of the height of the surface; and an intrasurface shape calculator means coupled to the third light receiving means for calculating the intrasurface shape of the sample in accordance with a change in the intensity of the reflected light intensity signal.

3. An optical device according to claim 1, wherein the second reflected split beam of light is reflected by the second beam splitter after having passed through the acousto-optical element.

4. An optical device according to claim 1, wherein the means for driving the acousto-optical element includes an input of a first frequency signal and a second frequency signal, and wherein the reference beat signal has a frequency equal to twice the difference between the frequencies of the first and second frequency signals input to the acousto-optical element.

* * * * *